Dec. 5, 1967   D. J. TREVARROW, JR   3,356,421
WHEEL AND WHEEL COVER ASSEMBLY
Filed July 28, 1966
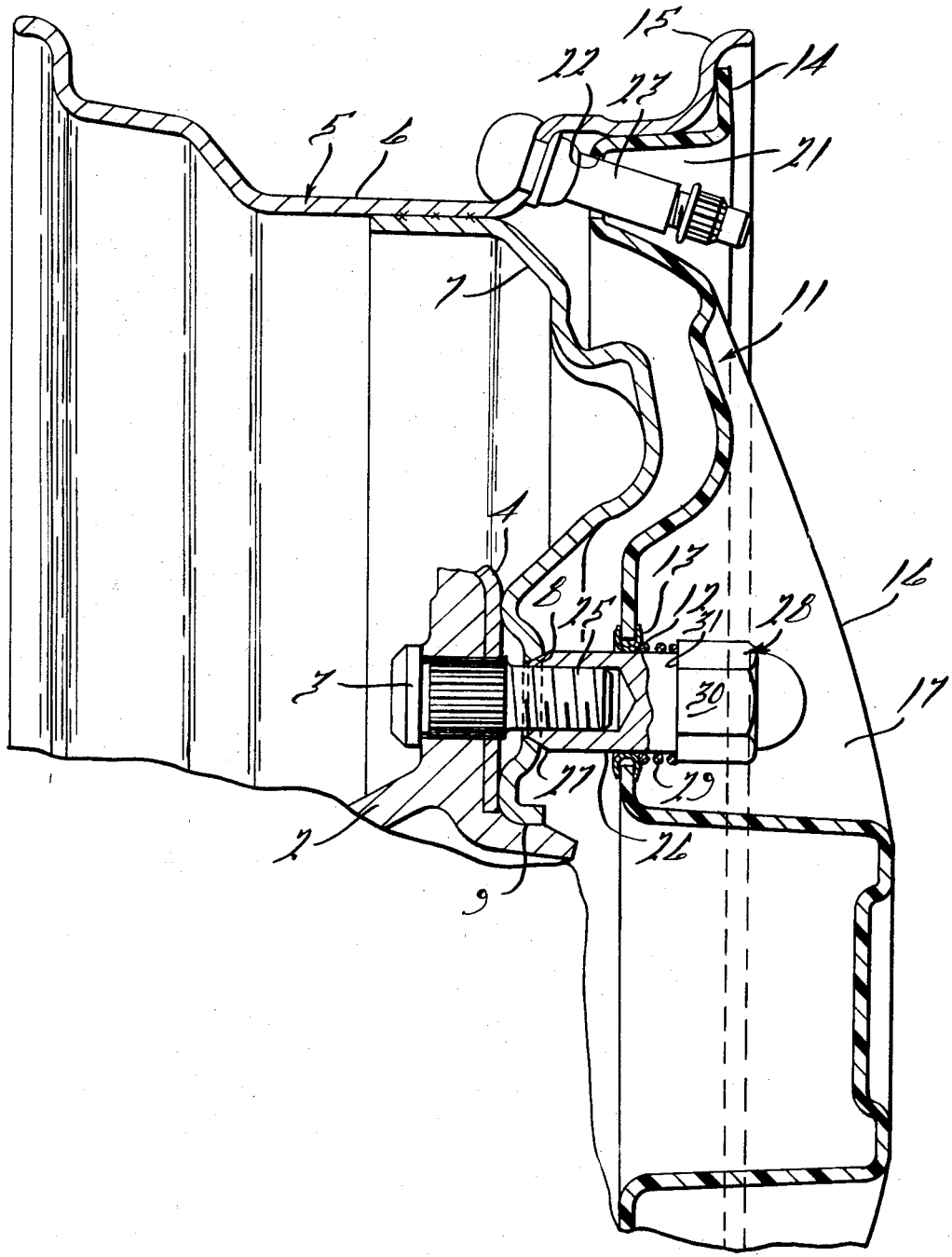
INVENTOR.
David J. Trevarrow Jr.
BY
Harness, Dickey & Pierce
ATTORNEYS.

3,356,421
WHEEL AND WHEEL COVER ASSEMBLY
David J. Trevarrow, Jr., Maple Glen, Pa., assignor to Kelsey-Hayes Company, Romulus, Mich., a corporation of Delaware
Filed July 28, 1966, Ser. No. 568,641
5 Claims. (Cl. 301—37)

This invention relates to wheel and wheel cover assemblies, and particularly to a wheel and cover assembly which resiliently supports the cover when the wheel is secured on the hub of the vehicle.

Various methods have been employed heretofore for securing wheel covers on wheels for the purpose of enhancing the vehicle appearance. In practicing the present invention, the nuts employed for securing the wheel to the studs on the hub have been lengthened to receive a coil spring. The body of the nuts extends through apertures in the cover and are aligned with the studs on the hub. Springs on the nut body press the cover inwardly to secure its peripheral flange against the rim of the wheel when the wheel is clamped on the hub. By applying the nuts to the studs after the wheel and cover had been placed thereover, the cover is locked to the wheel when the wheel is clamped on the hub.

Accordingly, the main objects of the invention are: to provide elongated nuts which pass through apertures of a wheel cover which is engaged by a spring on the nut to secure the cover on the wheel when the nut clamps the wheel on the hub; to provide a wheel cover with apertures having a grommet therein aligned with the studs which support the wheel the grommets being engaged by a coil spring around each nut which extends through the grommet and tightens the wheel on the stud to secure the cover to the wheel as the wheel is secured to the hub, and in general, to provide a wheel and cover assembly which is simple in construction, which readily retains both the cover and wheel on the hub, and which is economical of manufacture.

Other objects and features of novelty of the invention will be specifically pointed out or will become apparent when referring, for a better understanding of the invention, to the following description taken in conjunction with the accompanying drawing, wherein:

FIGURE 1 is a broken sectional view of a hub, wheel and cover assembly employed on a conventional automotive vehicle.

From the figure, it will be seen that a standard type of hub 2 is illustrated having a standard type of stud 3 extending through a plurality of apertures in nonrotatable relation therewith. It is to be understood that the plurality of the studs are accurately located to receive the apertures of the wheel which is placed thereover. It will be noticed from the figure that the inner flange 4 of the brake drum is secured over the plurality of studs 3 to fix the brake drum relative thereto. A wheel 5 having a rim 6 and a spider 7 has tapered apertures conforming to the number and location of the studs so that the wheel may be placed thereover. The wheel is centered by the studs as it is positioned by the locating surface 9 provided on the outer face of the hub 2. After the wheel had been placed over the studs 3, a wheel cover 11 is placed against the outer face of the wheel with a plurality of apertures 12 containing grommets 13 disposed in alignment with the studs 3, the outer flange 14 of the cover resting on the outer edge 15 of the wheel rim 6.

The cover has an arcuate surface 16 and indented areas 17 located at each of the areas disposed opposite to the studs 3. The grommet is employed when the wheel cover 11 is made of a plastic material to reinforce the edge of the aperture. When the cover is made of metal the grommet is not utilized. An annular outwardly presenting recess 21 near the rim flange 14 has an aperture 22 therein for receiving the valve stem 23 carried by the rim 6 of the wheel in the conventional manner. The aperture 22 orients the wheel cover for aligning the apertures 12 with the studs 3.

After the wheel spider has had the apertures 8 thereof disposed over the threaded ends 25 of the studs, the wheel cover 11 is then aligned with the studs when the aperture 22 has been placed over the valve stem 23. A plurality of nuts 26 are then inserted through the grommets 13 and screwed upon the threads 25 of the studs 3.

It will be noted that the nuts 26 have an elongated body portion between the tapered end 27 and the head 28 which has flats 30 on the side to receive a stud wrench. The head forms a shoulder 31 with the body against which one end of a coil spring 29 abuts. Upon the rotation of the nut, the tapered end 25 will engage the tapered aperture 8 of the wheel and locate and lock the wheel against the flange 4 of the brake drum. At the same time the inner end of the spring 29 will engage the grommet 13 and will retain it under a predetermined pressure to hold it in position without movement.

When the wheel cover 11 is made of plastic material it is preferably chrome coated, and the depressions 17 are preferably spray painted or otherwise coated to conform to or contrast with the color of the vehicle body. This provides a spoke-like construction to the cover in relation to the chrome plated surface therebetween. The arrangement provides a simple holding means for the cover which does not depend upon the amount of adjustment which is made to the holding means for the wheel, since any variation in the length of the nut 26 relative to the grommet 13 will be absorbed by the spring 29. With this arrangement, assurance is had that a predetermined pressure will be applied to all the grommets of the cover 11 when the wheel has been tightened upon the hub without consideration as to how many turns is required to set the nut.

What is claimed is:

1. In a wheel and wheel cover assembly, a plurality of nuts each having an elongated cylindrical body containing an internal thread and a taper on one end for clamping the wheel on a hub, said cover having a plurality of apertures, each aperture having a diameter slightly larger than said cylindrical body, means on the other end of said nuts for engaging said wheel cover when extending through an aperture thereof, said means including a head, and resilient means around said body providing a holding pressure between the head and the wheel cover.

2. In a wheel and wheel cover assembly as recited in claim 1, wherein said resilient means is a coil spring.

3. In a wheel and wheel cover assembly as recited in claim 2, wherein the apertures of the wheel cover have grommets therein with which said coil spring engages.

4. In a wheel and wheel cover assembly as recited in claim 2, wherein the peripheral edge of the cover engages the outer wall of the wheel rim.

5. In a wheel and wheel cover assembly as recited in claim 4, wherein said cover is of inverted dish shape having radial recesses containing the apertures and providing spoke-like appearance to the cover.

References Cited

UNITED STATES PATENTS

| | | | |
|---|---|---|---|
| 1,843,985 | 2/1932 | Nelson | 301—9 |
| 1,861,432 | 6/1932 | Barber | 301—37 |
| 1,985,908 | 1/1935 | Zerk | 301—37 |
| 2,135,481 | 11/1938 | Brink | 301—37 XR |
| 2,883,238 | 4/1959 | Lyon | 301—37 |
| 2,902,316 | 9/1959 | Black | 301—37 |

FOREIGN PATENTS 633,632  10/1927  France.

RICHARD J. JOHNSON, *Primary Examiner.*